June 23, 1942.  V. H. KIEHL  2,287,379
TWO-ROW TOPPER
Filed Oct. 23, 1940  2 Sheets-Sheet 1
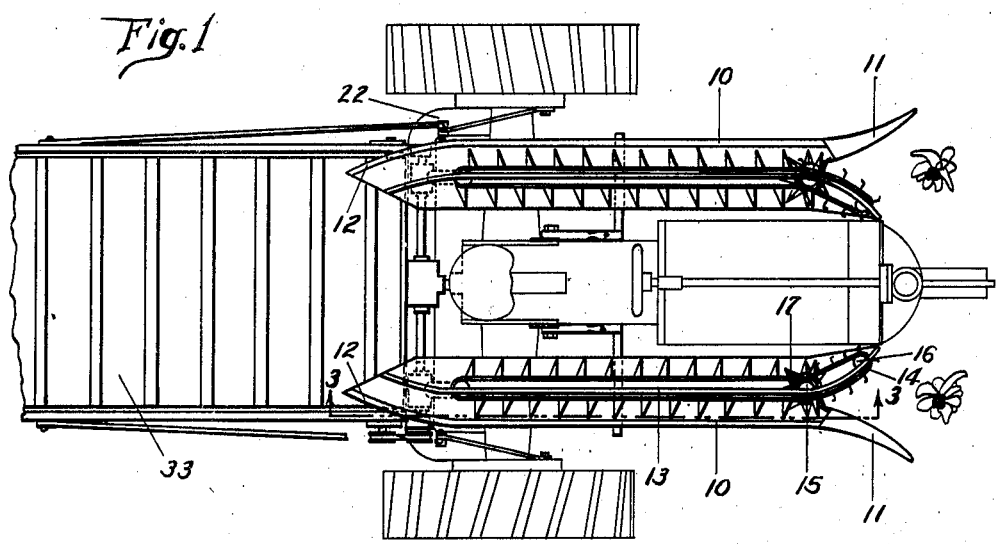
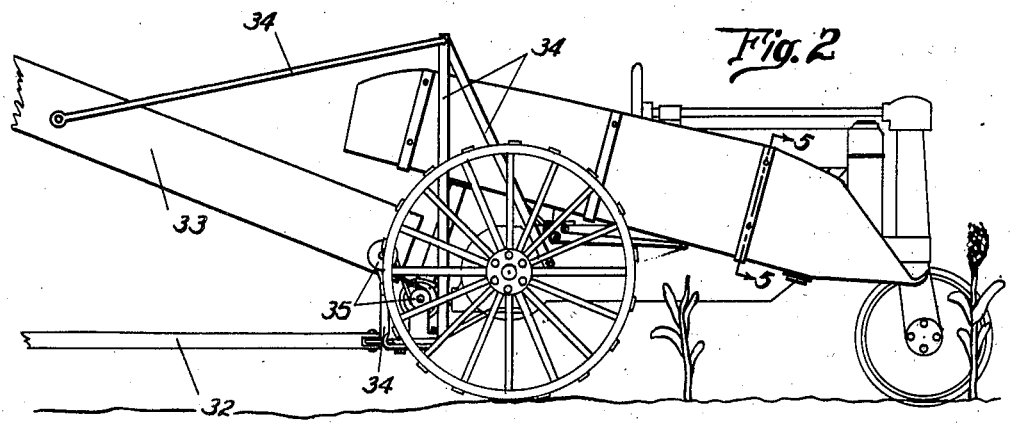
INVENTOR.
Vern H. Kiehl
BY
ATTORNEY.

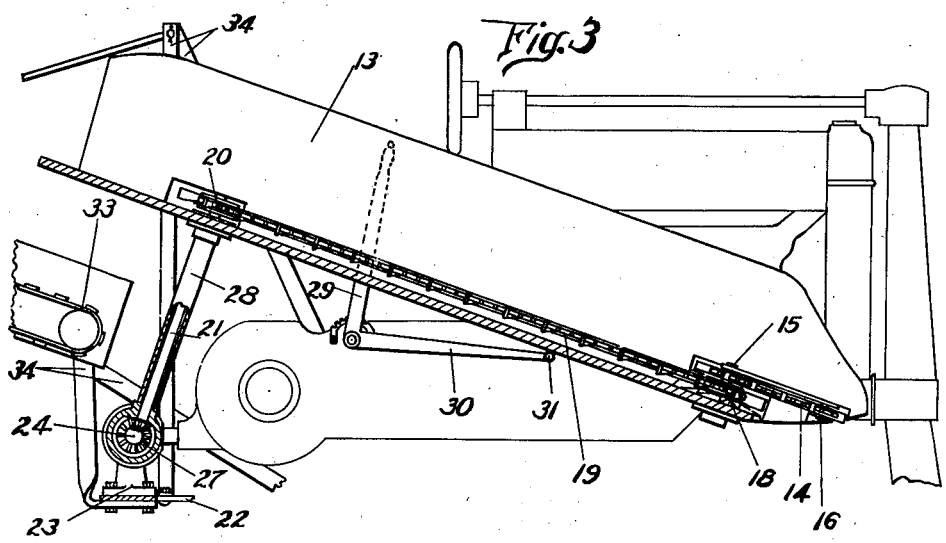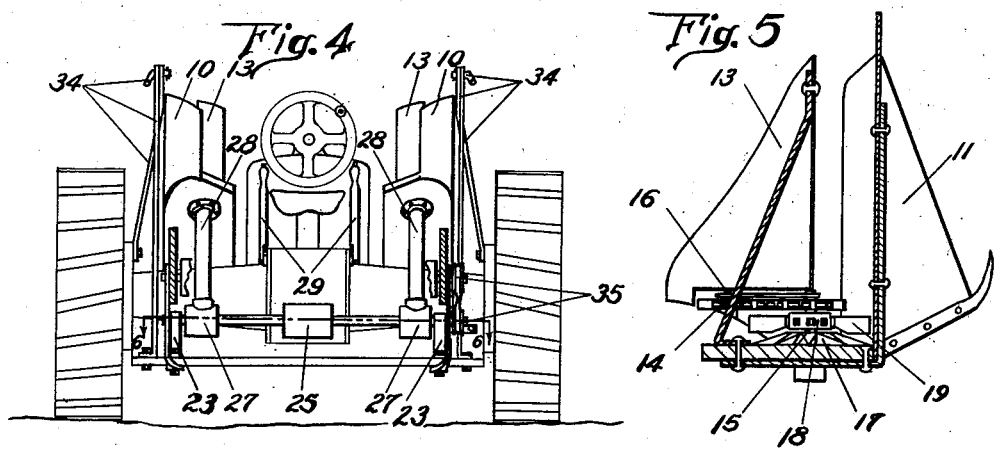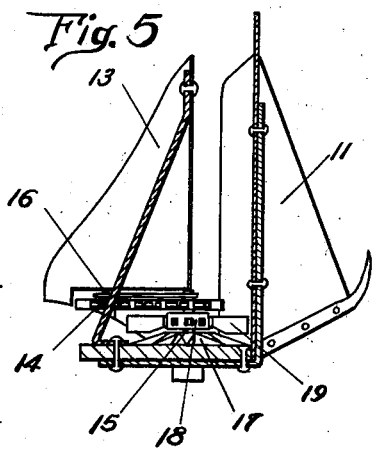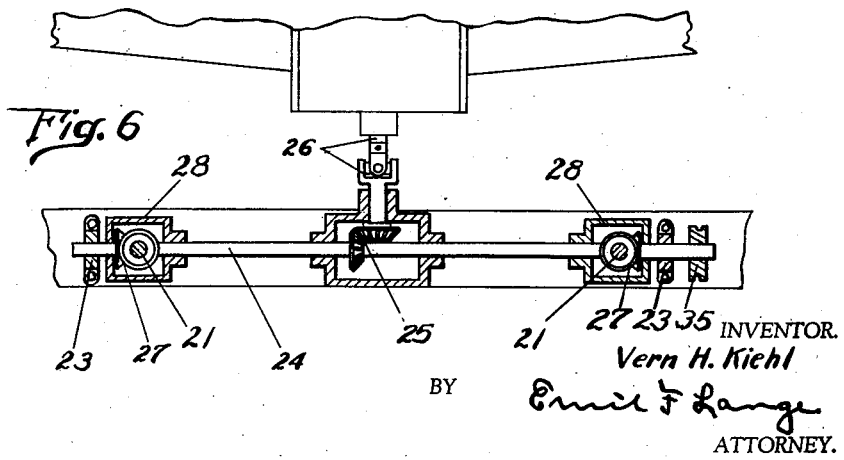

Patented June 23, 1942

2,287,379

UNITED STATES PATENT OFFICE 2,287,379

TWO-ROW TOPPER

Vern H. Kiehl, Guide Rock, Nebr.

Application October 23, 1940, Serial No. 362,383

8 Claims. (Cl. 56—15)

My invention relates to harvesters of certain crops like sorghum, its primary object being the provision of an attachment to a tractor for harvesting row crops, the tractor functioning as a mobile support for the harvester and also as a source of power for driving the harvesting mechanism.

Another object is the provision of a combined tractor and harvester with the controls for the harvester positioned for convenient actuation by the driver of the tractor.

Another of my objects is the provision of a harvesting attachment for a tractor, the harvesting attachment being designed to straddle the tractor and to operate simultaneously on two adjacent crop rows.

Another of my objects is the provision of a harvesting attachment for a tractor, the harvesting attachment being designed for quick and convenient adjustment to the height of the crop, the adjusting controls being within convenient reach of the operator of the tractor.

Another of my objects is the provision of a tractor attachment consisting of two harvesters for gathering the crops of adjacent rows, the harvesting attachment straddling the tractor and being individually adjustable to conform to the varying heights of the crop.

Having in view these objects and others which will be pointed out in the following description, I will now refer to the drawings, in which Figure 1 is a plan view of my topper, some of the tractor features being also shown to bring out the structural relation of the topper to the tractor.

Figure 2 is a view in side elevation of the topper.

Figure 3 is a sectional view on the line 3—3 of Figure 1, looking in the direction of the arrows.

Figure 4 is a view in rear elevation of the topper and parts of the tractor.

Figure 5 is a vertical sectional view on the line 5—5 of Figure 2.

Figure 6 is a view of the gear mechanism for driving the mechanism of the topper, the view being on the section line 6—6 of Figure 4 looking in the direction of the arrows.

My invention consists of a tractor attachment for harvesting the heads of sorghum grains and the like, the tractor providing a mobile support for the topper and also providing a source of power for driving the harvesting and conveying mechanism of the topper. The topper includes a harvesting conveyor and a loading conveyor.

The harvesting conveyor consists of two similar parts for straddling the tractor to operate on two rows of the standing crop. These two parts are alike in all respects except that they are right and left.

Each part is in the form of a harvesting conveyor which is upwardly and rearwardly inclined and which is provided with harvesting mechanism and with feeding mechanism at its forward or lower extremity adjacent the forward extremity of the tractor. Each part is in the form of a guideway having side walls and a floor with endless conveyor travelling over the floor to carry the grain heads upwardly and rearwardly.

In each half of the harvesting conveyor, there is an outer wall 10 which is curved outwardly at 11 and which is curved inwardly at 12. The wall 10 and its end extensions rise from the floor of the harvesting conveyor, being preferably formed from sheet metal. The inner wall 13 of the harvesting conveyor is spaced in parallel relation with the outer wall 10 except at its forward extremity, it being flared at this point to form a wide mouth for receiving the stalks of the crop and for urging them into the path of the cutter. The upstanding wall 13 is intermediate the sides of the floor of the harvesting conveyor.

The stalks of the crop are guided partly by the forward travel of the implement but also by the feeder 14 which is best shown in Figure 1. This consists of an endless conveyor travelling on sprocket wheels on the driven shaft 15 and the idle shaft 16. The stalks of the crops enter the wide mouth and they are immediately seized by the fingers of the feeder 14 and they are thus carried to the narrow throat between the walls 10 and 13.

The drive shaft 15 is positioned at the narrowest point in the throat and it carries a rotary cutter 17 which severs the grain heads from the stalks. The stalks immediately resume their upward position while the severed heads fall on the floor of the conveyor.

The endless chain conveyor functions as a drive for the shaft 15 which carries a sprocket wheel 18 meshing with the chain 19. The chain 19 meshes also with the sprocket wheel 20 which is pivotally driven through a shaft 21 and gearing as shown in Figure 6 and deriving its power from the tractor. It should be noted that the elevating run of the conveyor lies between the walls 10 and 13 and that the inner or idle run of the conveyor is not bounded by the inner wall.

The implement is supported at its forward extremities on the tractor body and at its rear extremities on the draw bar 22 of the tractor. The tractor draw bar 22 is in the form of a transverse bail and upon this is secured a plurality of brackets 23 for supporting the shaft 24. This shaft 24 is driven through gearing 25 from the power takeoff shaft 26 of the tractor. The shaft 24 is geared at 27 to drive both shafts 21 of the harvesting conveyors, the shafts 21 having their bearings in sleeves 28 which support the upper portions of the harvesting conveyors. It will be noted that at each end, the gearing consists of two meshing bevel gears, one secured to the shaft 24 and the other to shaft 21. The bevel gears on shaft 24 are opposed as to prevent longitudinal shifting of shaft 24. Because of this absence of longitudinal shifting of shaft 24, it is possible to use bevel gears for the gearing 25.

Crops of different grains vary greatly in height and there is also considerable variation in the height of the same grain and in the same field, making necessary an adjusting mechanism under response of the operator. The sleeve 28 is rigidly secured at its upper extremity to the floor of the harvesting conveyor but the lower extremity of the sleeve has arcuate movement about the shaft 24 as will be apparent from Figure 3. Moreover, slight arcuate movement about the shaft 24 will be translated into considerable movement up or down of the forward portions of the harvesting conveyor and such adjustments must be sensitive and under quick response to the operator. For providing convenient adjustment, I pivot a lever 29 to the tractor and within convenient reach of the driver of the tractor. At the lower extremity of the lever is an arm 30 which terminates in a transverse arm 31 having sliding contact with the floor of the harvesting conveyor. Movement of the lever 29 will raise or lower the forward extremity of the harvesting conveyor about the shaft 24 as a pivot.

Two streams of grain heads are thus conveyed to the rear of the tractor but the harvested crop should also be loaded into wagons for transportation. The wagons may be secured by attaching the tongue 32 to the tractor drawbar but means must also be provided for delivery of the harvested crop from the harvesting conveyor into the wagon. An elevating conveyor 33 is secured to the tractor drawbar, the width of the conveyor 33 being such that it would receive both of the converging streams of harvested grain heads. The conveyor 33 may be adequately braced to the tractor as shown at 34. This conveyor is driven as indicated in Figure 2 from a drive wheel 35 on the shaft 24.

The implement as above described is adapted for harvesting a variety of grains especially of the type of the sorghum grains. Numerous crops like sorgo, milo maize, kalo, kaffir corn, feterita, and many others produce the grains at the heads of the stalks which must be harvested by cutting the heads from the stalks and then separating the grains from the heads. The usual farm implements are not adapted for harvesting crops of this nature and in consequence, farmers have improvised methods for harvesting such crops either by hand or by use of implements already on the farm. These methods are usually unsatisfactory for one reason or another. If the heads are harvested by the use of a combine, the heads are left too damp to thrash and much of the harvest is spoiled in the bin. Corn binders leave too many heads in the field uncut or dropped. Harvesting by hand is a costly, long, slow, and back-breaking job.

My implement described is admirably adapted for harvesting such grains. It may be attached to any standard farm tractor and it may be so operated as to cut the grain having heads of various heights above the ground. Without stopping the tractor and without reducing its speed, the implement not only harvests all of the heads but it delivers them to the rear directly into a wagon.

Having thus described my invention in such full, clear, and exact terms that its construction and operation will be readily understood by others skilled in the art to which it pertains, what I claim as new and desire to secure by Letters Patent of the United States is:

1. A topper for attachment to a tractor having a body portion and a draw bar, said topper including an upwardly and rearwardly inclined harvesting elevator, a rotary cutter in the forward portion of said harvesting elevator for severing the grain heads from the stalks, an endless conveyor in said harvesting elevator, a supporting bracket and a transverse shaft releasably secured to the draw bar of the tractor, a supporting prop pivotally secured at its lower extremity to said transverse shaft and rigidly secured at its upper extremity to said harvesting conveyor at the upper extremity thereof, means under the control of the driver of the tractor for imparting arcuate movement to said harvesting conveyor about said transverse shaft as a pivot to thereby raise or lower the forward extremity of said harvesting elevator, and means for driving said rotary cutter and said endless conveyor.

2. A topper for attachment to a tractor having a body portion and a drawbar, said topper including an upwardly and rearwardly inclined harvesting elevator, a supporting bracket and a transverse shaft releasably secured to the drawbar of the tractor, a supporting prop pivotally secured at its lower extremity to said transverse shaft and rigidly secured at its upper extremity to said harvesting elevator at the upper extremity thereof, and means under the control of the driver of the tractor for imparting arcuate movement to said harvesting elevator about said transverse shaft as a pivot to thereby raise or lower the forward extremity of said harvesting elevator, said means including a lever having a forwardly extended arm with a transverse projection for supporting the forward extremity of said harvesting elevator, said transverse projection having sliding contact with the floor of said harvesting elevator.

3. In combination with a tractor having a power plant for driving the same, a topper attachment therefor, said topper including an upwardly and rearwardly inclined harvesting elevator, a movable cutter in the forward portion of said harvesting elevator for severing the grain heads from the stalks, an endless conveyor in said harvesting elevator, a transverse shaft, means for securing the same to the rear of the tractor, means for driving said shaft from the power plant of the tractor, a tubular prop journalled at its lower extremity on said transverse shaft and rigidly secured at its upper extremity to said harvesting elevator at the upper portion thereof, a driving shaft extending through said tubular prop and connected to said transverse shaft, connections between said driving shaft and said movable cutter and said endless conveyor, and means under the control of the driver of the tractor for imparting arcuate movement to said harvesting conveyor about said transverse shaft as a pivot to thereby raise or lower the forward extremity of said harvesting elevator.

4. In combination with a tractor having a power plant for driving the same, a topper attachment therefor, said topper including an upwardly and rearwardly inclined harvesting elevator, a movable cutter in the forward portion of said harvesting elevator for severing the grain heads from the stalks, an endless conveyor in said harvesting elevator, a transverse shaft, means for securing the same to the rear of the tractor, means for driving said shaft from the power plant of the tractor, a tubular supporting prop having its lower extremity in the form of a gear box journalled to said transverse shaft, the upper extremity of said prop being rigidly secured to said harvesting elevator at the upper portion thereof, a driving shaft extending through said tubular prop and connected to said transverse shaft by means of a pair of bevel gears in said gear box, connections between said driving shaft and said movable cutter and said endless conveyor, and means under the control of the driver of the tractor for imparting arcuate movement to said harvesting conveyor about said transverse shaft as a pivot to thereby raise or lower the forward extremity of said harvesting elevator.

5. In combination with a tractor having a power plant for driving the same, a two-row topper, said topper including a pair of upwardly and rearwardly inclined harvesting elevators, a movable cutter in the forward portion of each harvesting elevator for severing the grain heads from the stalks, an endless conveyor in each harvesting elevator, a transverse shaft, means for securing the same to the rear of the tractor, oppositely disposed bevel gears secured adjacent the ends of said shaft, means for driving said shaft from the power plant of the tractor, a separate tubular supporting prop pivotally secured at its lower extremity to each end of said transverse shaft and rigidly secured at its upper extremity to the associated harvesting conveyor at the upper portion thereof, a driving shaft extending through each tubular prop and having a bevel gear meshing with the bevel gear on the corresponding end of said transverse shaft, connections between each driving shaft and the movable cutter and endless conveyor of the associated elevator, and means under the control of the driver of the tractor for independently imparting arcuate movement to either harvesting conveyor about said transverse shaft as a pivot to thereby raise or lower the forward extremity of said harvesting elevator.

6. In combination with a tractor, a topper attachment therefor, said topper including an upwardly and rearwardly inclined harvesting elevator, a rotary cutter in the forward portion of said harvesting elevator for severing the grain heads from the stalks, an endless conveyor in said harvesting elevator, means for journalling said elevator to said tractor at the rear portion of said elevator, a bell crank lever journalled to said tractor with one arm thereof extending upwardly to be manipulated by the driver of the tractor and the other arm thereof bearing directly against the underside of the forward portion of said elevator so that the position of the forward extremity of said elevator can be adjusted by manipulation of said lever, means for locking said bell crank lever in any adjusted position, and means for driving said rotary cutter and said endless conveyor.

7. In combination with a tractor having a power plant for driving the same, a two-row topper, said topper including a pair of upwardly and rearwardly inclined harvesting elevators, a movable cutter in the forward portion of each harvesting elevator for severing the grain heads from the stalks, an endless conveyor in each harvesting elevator, a transverse shaft, means for securing the same to the tractor, means for pivotally securing said elevators to opposite ends of said shaft at the rear portions of said elevators, a separate bell crank lever journalled on each side of the tractor with one arm of each lever extending upwardly to be manipulated by the driver of the tractor and the other arm of each lever bearing directly against the underside of the forward portion of the elevator on the same side as the lever so that the position of the forward extremity of each elevator can be independently adjusted by manipulation of the associated lever, means for independently locking each bell crank lever in any adjusted position, and means for driving the movable cutters and the endless conveyors of both elevators from the power plant of the engine without interfering with the relative adjustability of said elevators.

8. In combination with a tractor having a power plant for driving the same, a two-row topper, said topper including a pair of upwardly and rearwardly inclined harvesting elevators, a movable cutter in the forward portion of each harvesting elevator for severing the grain heads from the stalks, an endless conveyor in each harvesting elevator, a transverse shaft, means for securing the same to the tractor, oppositely disposed bevel gears secured adjacent the ends of said shaft, means for driving said shaft from the power plant of the tractor, a separate tubular supporting prop pivotally secured at its lower extremity to each end of said transverse shaft and rigidly secured at its upper end to the associated harvester conveyor at the upper portion thereof, a driving shaft extending through each tubular prop and having a bevel gear meshing with the bevel gear on the corresponding end of said transverse shaft, connections between each driving shaft and the movable cutter and endless conveyor of the associated elevator, a separate bell crank lever journalled on each side of the tractor with one arm of each lever extending upwardly to be manipulated by the driver of the tractor and the other arm of each lever bearing directly against the underside of the forward portion of the elevator on the same side as the lever so that the position of the forward extremity of each elevator can be independently adjusted by manipulation of the associated lever, and means for independently locking each bell crank lever in any adjusted position.

VERN H. KIEHL.